United States Patent
Gann

(10) Patent No.: US 6,768,564 B1
(45) Date of Patent: Jul. 27, 2004

(54) LIGHT ATTENUATING FILTER IN CALIBRATION FOR TRANSPARENCY SCANNER

(75) Inventor: Robert G Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/519,095

(22) Filed: Mar. 6, 2000

(51) Int. Cl.$^7$ ................................................ H04N 1/04
(52) U.S. Cl. ........................ 358/487; 358/497; 358/504; 358/520
(58) Field of Search ................................ 358/487, 488, 358/512, 406, 506, 505, 538, 474, 497, 504, 520; 382/167

(56) References Cited

U.S. PATENT DOCUMENTS

| | | | |
|---|---|---|---|
| 5,012,276 A | * 4/1991 | Endo et al. | 355/402 |
| 5,134,469 A | * 7/1992 | Uchimura | 348/68 |
| 5,669,048 A | * 9/1997 | Nishio et al. | 399/206 |
| 6,106,139 A | * 8/2000 | Sugiyama et al. | 362/326 |
| 6,480,625 B1 | * 11/2002 | Yamazaki | 382/167 |

* cited by examiner

Primary Examiner—Mark Wallerson
Assistant Examiner—Negussie Worku

(57) ABSTRACT

A light attenuating filter is introduced between a light source and a light sensor in a calibration region of a transparency scanner. The transparency scanner includes a carriage for supporting the light source, a transparent platen, and a housing for supporting the transparent platen. The light attenuating filter is placed in the calibration region either as part of a template resting on the transparent platen, as part of housing, or as part of the carriage. Light from the light source is directed through the light attenuating filter and onto the light sensor. The transparency scanner is calibrated to compensate for the attenuation of light by the light attenuating filter. Calibrating the transparency scanner includes adjusting one or more parameters for controlling the transparency scanner. Examples of parameters used for controlling the transparency scanner include light source intensity, light source exposure time, and analog and digital gain of a signal produced by the light sensor. In order to achieve a color balance in the calibration, the light attenuating filter may attenuate light of one color more than light of another color. When the transparency scanner is calibrated using this filter, color balance of the transparency scanner is adjusted.

20 Claims, 4 Drawing Sheets

LIGHT ATTENUATING FILTER IN CALIBRATION FOR TRANSPARENCY SCANNER

FIELD OF THE INVENTION

This invention relates in general to calibrating scanners and, more particularly, to calibrating a transparency scanner using a light attenuating filter.

BACKGROUND OF THE INVENTION

Many scanners are able to scan transparencies such as slides, and negatives. A light source or lamp is positioned on one side of the transparency to be scanned and illuminates the transparency. A light sensor is positioned directly opposite the light source to receive the illumination after it passes through the transparency.

Typically, the scanning process includes a calibration step before the transparency is scanned. In the calibration step, the light sensor and the light source are moved to an unobstructed area where light passes directly from the light source to the light sensor without passing through the transparency. An image of the light source is then captured by the light sensor. Operating parameters of the scanner are then adjusted so that the image of the light source captured by the light sensor is interpreted by the scanner as full exposure. Full exposure translates into full white in an image created by the scan. Factors that may influence the image captured by the light sensor include lamp brightness, lamp color, lamp illumination profile, and light sensor pixel response.

The media used for most transparencies attenuates light by a significant amount. Even in the lightest area, the transparency significantly attenuates light from the scanner's light source. After a conventional calibration, the brightest area of the transparency during a scan will be significantly lower than full exposure. Therefore, scanning a transparency after a conventional scan will result in an image that is darker than full white.

One prior solution attempts to compensate for the light attenuation by increasing the exposure or intensity of the light source. However, the prior art does not present a solution for determining by what amount the exposure or intensity of the light source should be increased.

SUMMARY OF THE INVENTION

According to principles of the present invention, a light attenuating filter is introduced between a light source and a light sensor in a calibration region of a transparency scanner. Light from the light source is directed through the light attenuating filter and onto the light sensor. The transparency scanner is calibrated to compensate for the attenuation of light by the light attenuating filter.

According to further principles of the present invention, the transparency scanner includes a carriage for supporting the light source, a transparent platen, and a housing for supporting the transparent platen. The light attenuating filter is placed in the calibration region either as part of a template resting on the transparent platen, as part of housing, or as part of the carriage.

According to further principles of the present invention, calibrating the transparency scanner includes adjusting one or more parameters for controlling the transparency scanner. Examples of parameters used for controlling the transparency scanner include light source intensity, light source exposure time, and analog and digital gain of a signal produced by the light sensor.

According to further principles of the present invention, in order to achieve a color balance in the calibration, the light attenuating filter may attenuate light of one color more than light of another color. When the transparency scanner is calibrated using this filter, color balance of the transparency scanner is adjusted.

Other objects, advantages, and capabilities of the present invention will become more apparent as the description proceeds.

DETAILED DESCRIPTION OF THE INVENTION

Figure 1:
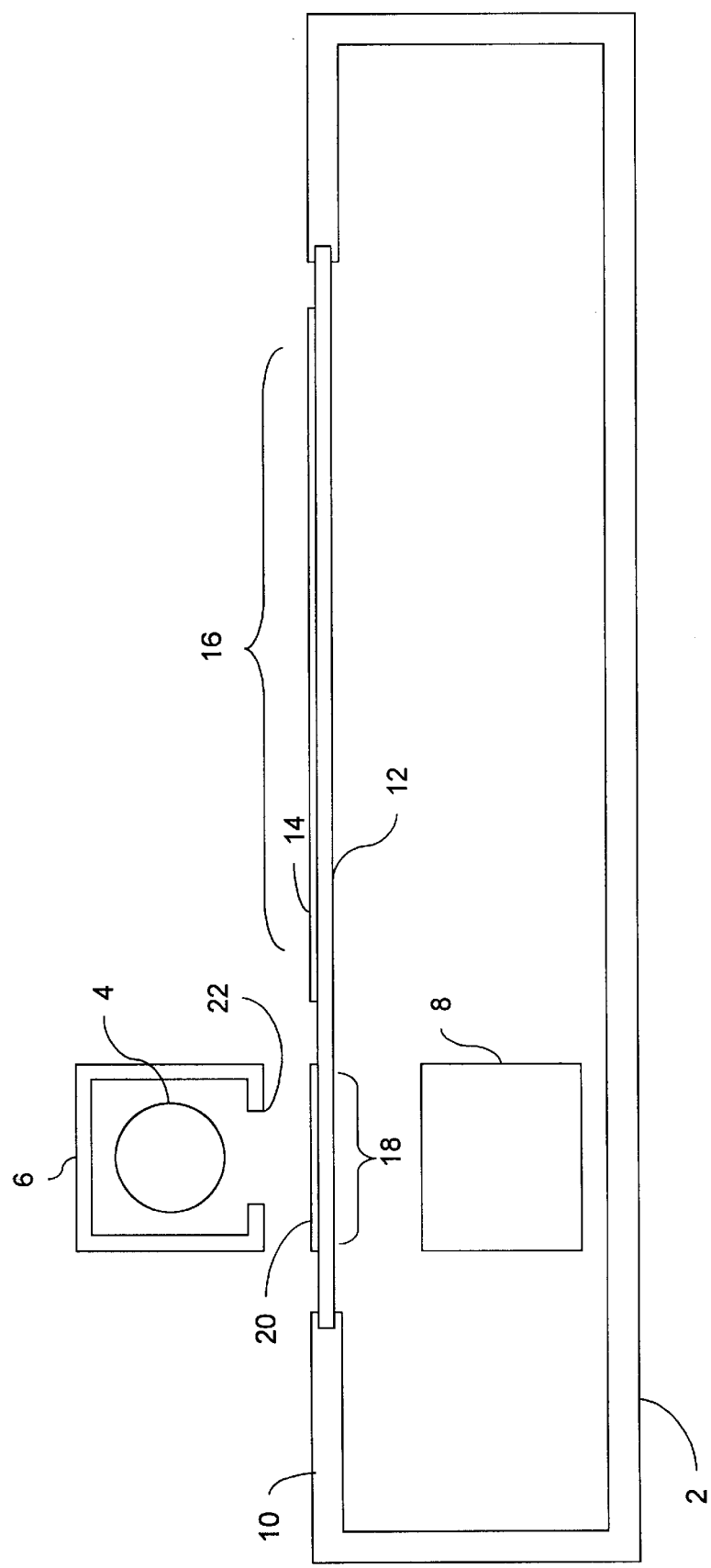
FIG. 1 is a side view diagram illustrating a transparency scanner with a first embodiment of a calibrating filter of the present invention.
Figure 2:
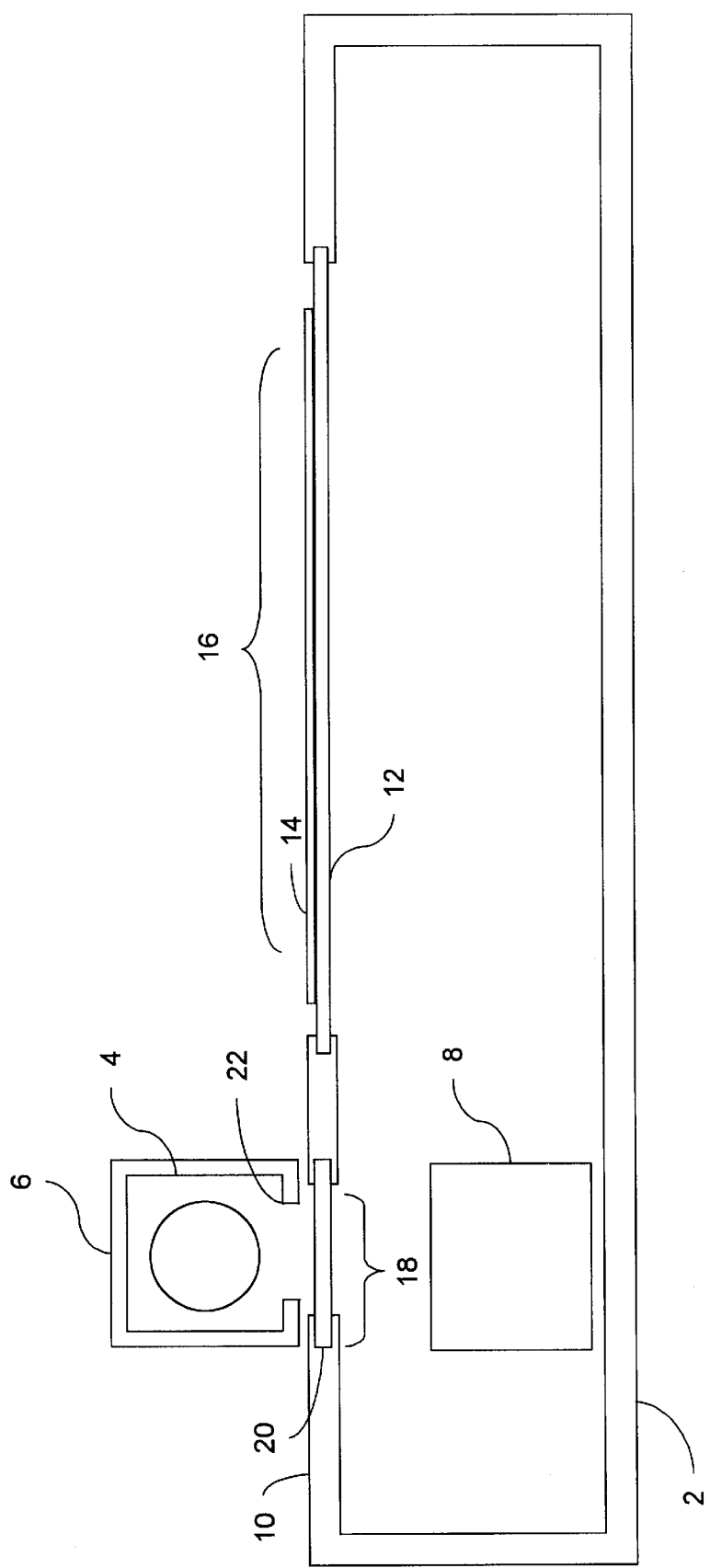
FIG. 2 is a side view diagram illustrating a transparency scanner with a second embodiment of a calibrating filter of the present invention.

FIGS. 1 and 2 illustrate in a cut away view, a transparency scanner 2 having a light source 4 supported by a carriage 6, a light sensor 8 disposed within a housing 10, and a transparent platen 12 supported by housing 10. Resting upon transparent platen 12 is a transparency 14.

Transparency 14 is any medium that allows light to pass through that may be scanned by transparency scanner 2. Examples of transparencies 14 include slides and negatives.

Aside from the modifications described for the present invention, transparency scanner 2 is a typical transparency scanner or flatbed scanner with a transparency adapter. Many features commonly found in transparency scanners 2 are not illustrated in the Figures in order to more clearly represent the present invention.

Housing 10 and transparent platen 12 provide a means for supporting transparency 14. Housing 10 and transparent platen 10 are, in fact, the typical means for supporting transparency 14. However, the present invention neither requires housing 10 nor transparent platen 12 in all embodiments. The present invention merely requires a means for supporting transparency 14 having at least one window for allowing light from light source 4 to pass to light sensor 8.

The means for supporting transparency 14 includes a scanning region 16 and a calibration region 18. Light must pass from light source 4 to light sensor 8 in both scanning region 16 and calibration region 18. Scanning region 16 and calibration region 18 may be in the same window or separate windows.

FIG. 1 illustrates a light attenuating filter 20 supported by transparent platen 12. FIG. 2 illustrates light attenuating filter 20 supported by housing 10. In each of these two embodiments, light attenuating filter 20 is supported in calibration region 18.

Light attenuating filter 20 is any medium having light attenuating properties similar to a conventional transparency 14. Since most transparencies have similar light attenuation properties, it is possible to select one filter for use with all transparencies. Alternatively, light attenuating filter 20 is any medium having light attenuating properties similar to a specific transparency 14. In another embodiment, light attenuating filter 20 is a colored medium for calibrating transparency scanner 4 for color variations or to balance recorded color intensities.

Light source 4 is any light source useable by transparency scanner 2 for directing light through transparency 14 and light attenuating filter 20 onto light sensor 8. Light source 4 provides light to calibration region 18 and scanning region 16. In one embodiment, light source 4 is moveable across the calibration 18 and scanning 16 regions. Typically, light source 4 is carried across calibration region 18 and scanning region 16 by carriage 6. Carriage 6 includes an opening 22 through which light from light source 4 is directed to light sensor 8. The present invention does not require carriage 6, only a means for moving light source 4 across calibration 18 and scanning 16 regions. However, carriage 6 is useful to the present invention as a convenient means for carrying light source 4 and for directing light from light source 4.

In an alternate embodiment, light source 4 is fixed relative to transparency scanner 2 and positioned so that light from light source 4 is provided to calibration region 18 and scanning region 16. In this embodiment, carriage 6 takes the form of a light box covering calibration region 18 and scanning region 16. Carriage 6 includes an opening 22 through which light from light source 4 is directed to light sensor 8. The present invention does not require carriage 6, only a means for supporting light source 4. However, carriage 6 is useful to the present invention as a convenient means for supporting light source 4 and for directing light from light source 4.

Light sensor 8 is any light sensor useable by transparency scanner 2 for sensing light from light source 4 and generating a signal responsive to the light sensed from light source 4. In one embodiment, light sensor 8 is moveable across the calibration region 18 and scanning region 16 simultaneously with the movement of light source 4. Any means useable by transparency scanner 2 for moving light sensor 8 will suffice for purposes of the present invention.

In an alternate embodiment, light sensor 8 is fixed relative to transparency scanner 2 and positioned to receive light passing through calibration region 18 and scanning region 16.

Although FIGS. 1 and 2 illustrate light sensor 8 within housing 10 and light source 4 external to housing 10, any arrangement of light source 4 and light sensor 8 is permissible for the present invention whereby light source 4 and light sensor 8 are moveable simultaneously across scanning 16 and calibration 18 regions.

Figure 3:
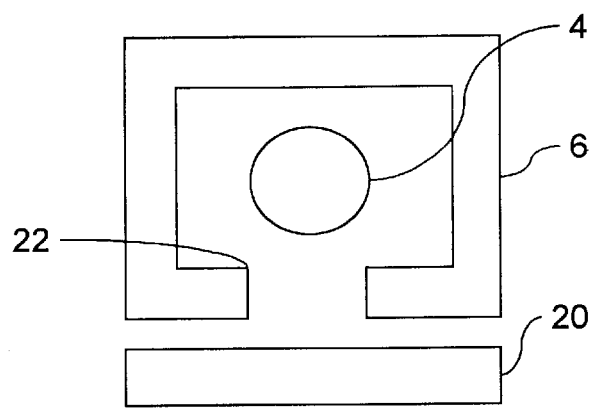
FIG. 3 is a side view diagram illustrating a light source carriage with a third embodiment of a calibrating filter of the present invention.

FIG. 3 illustrates an embodiment of the present invention whereby carriage 6 supports light attenuating filter 20. In this embodiment, light attenuating filter 20 is moveable so that light attenuating filter 20 is interposed between light source 4 and calibrating region 18, but not between light source 4 and scanning region 16.

Figure 4:
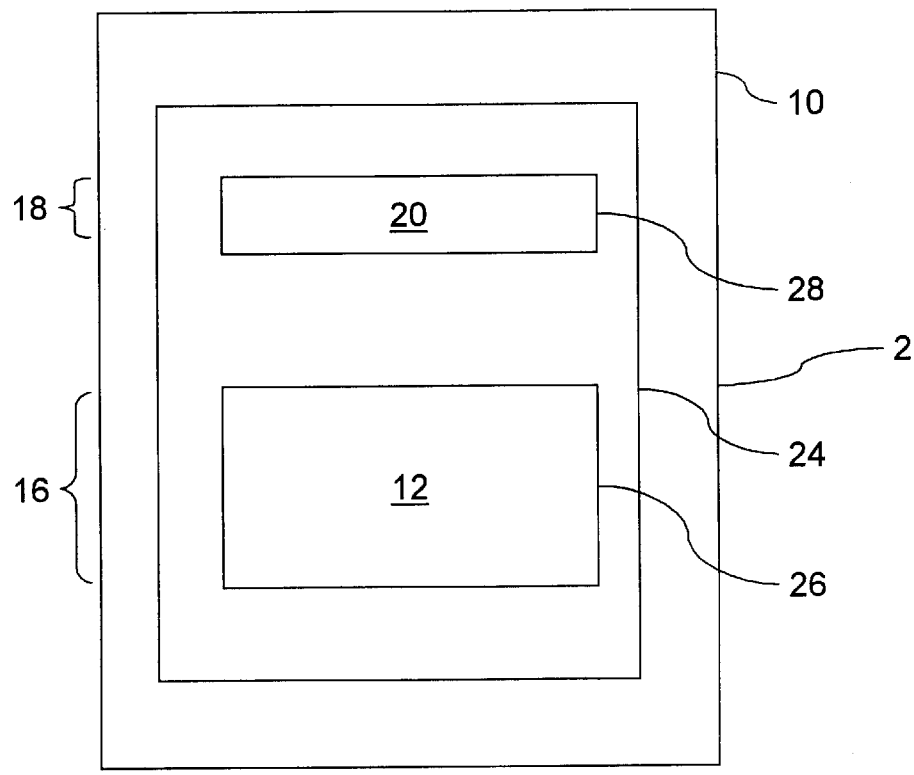
FIG. 4 is a top view diagram illustrating a template for use in the first embodiment of the present invention.

FIG. 4 is a top view of transparency scanner 2 illustrating a template 24 for use in transparency scanning. Template 24 includes an opening 26 in scanning region 16 and an opening 28 in calibration region 18. Opening 26 in scanning region 16 provides a convenient location for placing transparency 12 to be scanned. Opening 28 in calibration region 18 provides a convenient location for light attenuating filter 20.

Not shown in the Figures is a control system for controlling the operation and calibration of transparency scanner 2. The control system executes the method of the present invention.

Figure 5:
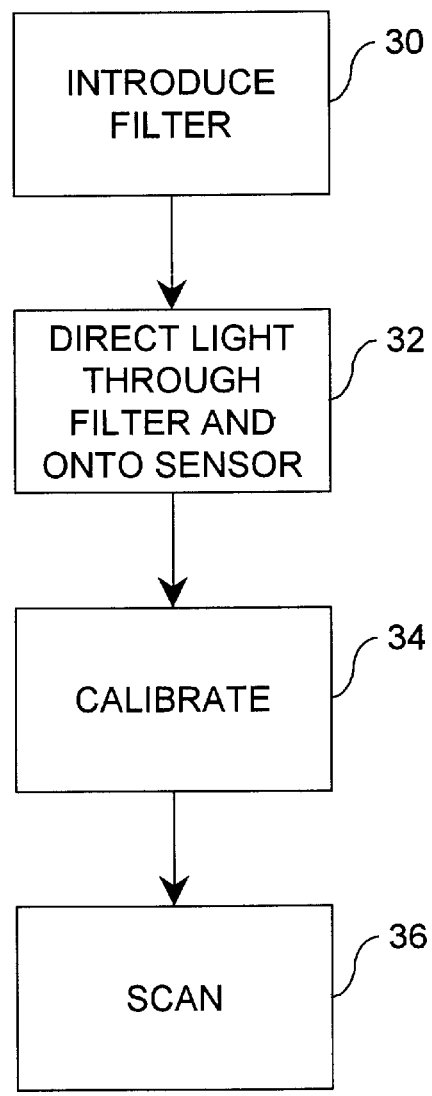
FIG. 5 is flow chart illustrating the method of the present invention.

FIG. 5 illustrates the method of the present invention. Although FIG. 5 depicts steps of the method in a specific order, the present invention encompasses variations in the timing of the illustrated steps as well as additional steps performed between those steps illustrated.

Light attenuating filter 20 is introduced 30 between light source 4 and light sensor 8. In the embodiments of FIGS. 1, 2, and 4 light attenuating filter 20 is fixed within the means for supporting transparency 14 at a location within calibration region 18. In one embodiment, light source 4 and light sensor 8 move near the fixed position so that light attenuating filter 20 is between light source 4 and light sensor 8. In an alternate embodiment, light source 4 is fixed to provide light through light attenuating filter 20 and light sensor 8 moves near the fixed position of light attenuating filter 20.

In the embodiment of FIG. 3, light attenuating filter 20 is moveable. Light source 4 and light sensor 8 move to a position near calibration region 18. Light attenuating filter 20 is then positioned between light source 4 and calibration region 18. Alternatively, light attenuating filter 20 is positioned between light source 4 and calibration region 18 before or while light source 4 and light sensor 8 are moved near calibration region 18. Since calibration region 18 is between light source 4 and light sensor 8, positioning light attenuating filter 20 between light source 4 and calibration region 18 also positions light attenuating filter. 20 between light source 4 and light sensor 8.

After light attenuating filter 20 is introduced between light source 4 and light sensor 8, light is directed 32 through light attenuating filter 20 and onto light sensor 8. The control system of transparency scanner 2 then calibrates 34 transparency scanner 2 to compensate for the attenuation of light by light attenuating filter 20.

The control system may adjust any parameters within its control for calibrating 34 transparency scanner 2. Typical parameter within the control of the control system include light source 4 intensity, light source 4 exposure time, analog gain of the signal from light sensor 8, and digital gain of the signal from light sensor 8.

After calibration 34, transparency 14 is scanned 36. Since transparency scanner 2 was calibrated using light attenuating film 20, transparency 14 is overexposed so that better use of the dynamic range of light sensor 8 is achieved.

It should be understood that the foregoing description is only illustrative of the invention. Various alternatives and modifications can be devised by those skilled in the art without departing from the invention. Accordingly, the present invention is intended to embrace all such alternatives, modifications, and variances that fall within the scope of the appended claims.

What is claimed is:

1. A method for calibrating a transparency scanner having a means for supporting a transparency, a light source, and a light sensor, the method comprising:

introducing a light attenuating filter between the light source and the light sensor;

directing light from the light source through the light attenuating filter and onto the light sensor;

calibrating the transparency scanner to compensate for the attenuation of light by the light attenuating filter;

removing the light attenuating filter from between the light source and the light sensor; and with the light attenuating filter removed, scanning a transparency using the compensation from the calibration.

2. The method of claim 1 wherein the means for supporting the transparency includes a transparent platen between the light source and the light sensor and wherein introducing the light attenuating filter between the light source and the light sensor includes placing the light attenuating filter on the transparent platen.

3. The method of claim 1 wherein the means for supporting the transparency includes a housing and wherein introducing the light attenuating filter between the light source and the light sensor includes inserting the light attenuating filter in the housing between the light source and the light sensor.

4. The method of claim 1 wherein the transparency scanner includes a carriage for supporting the light source and wherein introducing the light attenuating filter between the light source and the light sensor includes providing the light attenuating filter in the carriage between the light source and the light sensor.

5. The method of claim 1 wherein calibrating the transparency scanner includes adjusting a light intensity of the light source to compensate for attenuation of light by the light attenuating filter in the calibration region.

6. The method of claim 1 wherein calibrating the transparency scanner includes adjusting an exposure time of the light source to compensate for attenuation of light by the light attenuating filter in the calibration region.

7. The method of claim 1 wherein the light sensor produces a signal indicative of light intensity sensed by the light sensor, wherein the signal is amplified by a gain, and wherein calibrating the transparency scanner includes adjusting the gain to compensate for attenuation of light by the light attenuating filter in the calibration region.

8. The method of claim 1 wherein the light attenuating filter attenuates light of a first color more than light of a second color and wherein calibrating the transparency scanner includes calibrating the transparency scanner to increase intensity of the second color in scanned transparencies.

9. A transparency scanner for optically scanning a transparency, the transparency scanner comprising:

means for supporting the transparency, including at least one window therein, defining a scanning region and a calibration region respectively separate from the scanning region;

a light source for providing light across the calibration and scanning regions;

a light sensor for sensing light from the light source passing through the calibration and scanning regions; and, a light attenuating filter interposed between the light source and the calibration region.

10. The transparency scanner of claim 9 wherein the means for supporting the transparency includes a transparent platen and wherein the light attenuating filter is supported within the calibration region by the transparent platen.

11. The transparency scanner of claim 9 wherein the means for supporting the transparency includes a housing and wherein the light attenuating filter is supported within the calibration region by the housing.

12. The transparency scanner of claim 9 further including a carriage supporting the light source and the light attenuating filter.

13. The transparency scanner of claim 9 further including means for adjusting a light intensity of the light source to compensate for attenuation of light by the light attenuating filter in the calibration region.

14. The transparency scanner of claim 9 further including means for adjusting an exposure time of the light source to compensate for attenuation of light by the light attenuating filter in the calibration region.

15. The transparency scanner of claim 9 wherein the light sensor includes means for producing a signal responsive to light intensity sensed by the light sensor and wherein the transparency scanner further includes means for amplifying the signal by a gain and means for adjusting the gain to compensate for attenuation of light by the light attenuating filter in the calibration region.

16. The transparency scanner of claim 9 wherein the light attenuating filter attenuates light of a first color more than light of a second color and wherein the transparency scanner further includes means for calibrating the transparency scanner to increase intensity of the second color in scanned transparencies.

17. A system for calibrating a transparency scanner having a means for supporting a transparency, a light source, and a light sensor, the method comprising:

means for introducing a light attenuating filter between the light source and the light sensor;

means for directing light from the light source through the light attenuating filter and onto the light sensor;

means for calibrating the transparency scanner to compensate for the attenuation of light by the light attenuating filter;

means for removing the light attenuating filter from between the light source and the light sensor; and means for scanning a transparency, with the light attenuating filter removed, using the compensation from the calibration.

18. The system of claim 17 wherein the means for calibrating the transparency scanner includes means for adjusting a light intensity of the light source to compensate for attenuation of light by the light attenuating filter in the calibration region.

19. The system of claim 17 wherein the means for calibrating the transparency scanner includes means for adjusting an exposure time of the light source to compensate for attenuation of light by the light attenuating filter in the calibration.

20. The system of claim 17 wherein the light sensor includes means for producing a signal responsive to light sensed by the light sensor and wherein the transparency scanner further includes means for amplifying the signal by a gain and means for adjusting the gain to compensate for attenuation of light by the light attenuating filter in the calibration region.

* * * * *